United States Patent [19]

Wahlen

[11] 4,025,353

[45] May 24, 1977

[54] VISCOSE SOLUTIONS AND PROCESS FOR PREPARING THE SAME

[75] Inventor: Svante Ludvig Wahlen, Stenungsund, Sweden

[73] Assignee: Berol Kemi AB, Stenungsund, Sweden

[22] Filed: Sept. 22, 1975

[21] Appl. No.: 615,648

[30] Foreign Application Priority Data

Sept. 23, 1974 Sweden .............................. 7411920

[52] U.S. Cl. .............................................. 106/165
[51] Int. Cl.$^2$ .......................................... C08L 1/24
[58] Field of Search .......................... 106/165–168; 264/191; 252/156, DIG. 1; 260/615 B

[56] References Cited

UNITED STATES PATENTS

| | | | |
|---|---|---|---|
| 2,519,227 | 8/1950 | Collins | 106/165 |
| 3,423,499 | 1/1969 | Ticknor | 106/165 |
| 3,708,364 | 1/1973 | Kalopissis | 260/615 B |

OTHER PUBLICATIONS

"Surfactants in Viscose", Ind. & Eng. Chem., vol. 51, No. 4, Apr., 1959, pp. 535–538.

*Primary Examiner*—Theodore Morris

[57] ABSTRACT

Viscose solutions are provided having improved processability due to the presence therein of a nitrogen-free nonionic surface-active compound having a hydrocarbon group of at least eight carbon atoms and at least two oxyalkylene groups having from two to four carbon atoms, the oxyethylene groups comprising at least from 55 to 87% by weight of the compound.

24 Claims, No Drawings

VISCOSE SOLUTIONS AND PROCESS FOR PREPARING THE SAME

The preparation and processing of viscose solutions derived from wood cellulose has long been plagued by the resinous and fatty substances also derived from the wood and present as impurities with the cellulose. These materials impair the clarity and transparency of the viscose solutions and the resulting regenerated cellulose, and can precipitate, forming insoluble deposits, in various portions of the equipment, such as in the pipes, pumps, spinneret passages and nozzles, and coagulation troughs, and also are responsible for impairing the physical properties of the regenerated cellulose filaments and films, resulting in breaks.

In order to counteract these difficulties, surface-active agents have been incorporated in viscose solutions. Thus, for example, the surface-active ethylene oxide adducts of polyamines have been proposed for the purpose, as described in U.S. Pat. No. 3,232,779, patented Feb. 1, 1966, to Schonfeldt, Grunewald and Steijner, and in his text *Oberflachenaktive Anlagerungsprodukte des Athylenoxyds ihre Herstellung, Eigenschafter und Anwendung*, Wissenschaftliche Verlagsgesellschaft m.b.H. Stuttgart (1959). Sulfated and sulfonated petroleum derivatives have also been proposed, but due to their anionic nature, they are not normally compatible with the cationic compounds which are added for other purposes to viscose solutions at various stages of the processing and consequently, their application is limited. Adducts of ethylene oxide with fatty alcohols have also been proposed, but have been found to be of limited application.

Of the various types of surface-active agents proposed, the polyoxyethylene adducts of fatty amines are the most generally accepted, and in various forms are the type of additive normally employed. However, even the use of these surface-active compounds is not always free from objection. In practice, it has been found quite difficult to completely remove these adducts from the regenerated cellulose, which is undesirable because of the unsatisfactory properties which the cationic rsiduies impart to the filaments. Consequently, there is a need for nonionic surface-active agents which are nitrogen-free, and therefore leave no cationic residues, but which are nonetheless as effective as the nitrogen-containing polyoxyethylene adducts of fatty amines, in solubilizing the wood-derived resins and fatty substances during viscose processing.

In accordance with the invention, nitrogen-free nonionic polyoxyalkylene compounds are provided, which when dissolved or dispersed in viscose solutions are effective solubilzers for resin and fatty substances. The nonionic surface-active compounds in accordance with the invention have the following characteristic features:

1. a hydrocarbon group having at least six carbon atoms, up to about 50 carbon atoms, preferably from about eight to about 24 carbon atoms; and
2. at least two up to about five mono or poly oxyalkylene groups composed of one or more oxyalkylene units $OC_nH_{2n}$ and having the general formula:

$$-(OC_nH_{2n})_m\,OH$$

wherein:

$n$ is 2, 3, or 4, i.e., the oxyalkylene group is oxyethylene, oxypropylene, or oxybutylene; and $m$ is the number of oxyalkylene units in the group, and ranges from 1 to about 30, it being understood that the number $m$ need not be an integer, but represents the average number of such groups in the compound, the compound generally being composed of a mixture of individual species of varying numbers of oxyalkylene units per group due to the adduct-forming process by which they are generally prepared.

While $n$ can be 3 or 4, the oxyethylene groups where $n$ is 2 are from about 55 to about 87%, preferably from 65 to 79%, by weight of the compound.

The oxyalkylene groups are attached to the hydrocarbon chain spaced by from one to six connecting atoms.

In addition to the above features, which are the essential features, the hydrocarbon groups can include one or more of thioether, sulfoxide, sulfone, and oxyether groups in the hydrocarbon chain.

Accordingly, the nonionic nitrogen-free surface-active compounds in accordance with the invention can be defined by the formula:

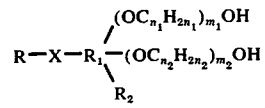

wherein:

R represents a monovalent hydrocarbon group having at least six carbon atoms up to about 50 carbon atoms and preferably from about eight to about 24 carbon atoms.

$R_1$ is a tetravalent hydrocarbon group having from one to about six carbon atoms.

X represents a bivalent methylene, thioether —S—, oxyether —O—, sulfoxide

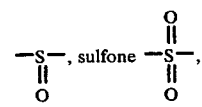

or oxyalkylene of the type of I above, $-(OC_nH_{2n})_mO-$.

$R_2$ is hydrogen or an oxyalkylene group $-(OC_nH_{2n})_m\,OH$ $n_1$, $n_2$, and $n_3$ are 2, 3, or 4, and in at least from about 55 to about 87% by weight of the compound, and preferably from 65 to 79% by weight of the compound, $n$ is 2.

$m_1$, $m_2$, and $m_3$ represent the number of oxyalkylene units, and are within the range from 1 to 30, it being understood that $m_1$, $m_2$, and $m_3$ need not be integers, but can represent average numbers, according to the degree of substitution of oxyalkylene units in the compound.

Preferably, $m_1$, $m_2$, and $m_3$ total from about 5 to about 50, and the total number of oxyethylene groups is at least 70% by weight of the compound.

An especially preferred class of nonionic surface-active compounds falling with the above formula II are those having the formula:

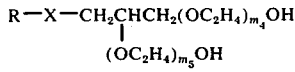

wherein:
R and X are as defined in formula II; and
$m_4$ and $m_5$ represent the number of oxyalkylene units, include average numbers, and are within the range from 1 to about 30.

Another class of preferred compounds falling within the above formula II are those having the formula:

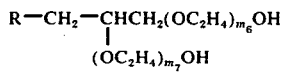

wherein:
R is as defined above; and
$m_6$ and $m_7$ represent the number of oxyethylene units, include average numbers, and are within the range from 1 to about 30, and the sum of $m_6$ and $m_7$ is from about 8 to about 31.

An amount of oxypropylene and/or oxybutylene units as oxyalkylene units within the range from about 1 to about 30% by weight of the compound impart improved physical properties to the compounds. However, if the proportion of oxypropylene and/or oxybutylene units exceeds about 30%, the solubility of the compounds in viscose solutions may be reduced to an unacceptably low level.

Exemplary R aliphatic hydrocarbon substituents include hexyl, heptyl, isoheptyl, octyl, isooctyl, 2-ethylhexyl, tertiary-octyl, nonyl, isononyl, tertiary-nonyl, decyl, isodecyl, tridecyl, dodecyl, myristyl, palmityl, margaryl, stearyl, oleyl, ricinoleyl, linoleyl, linolenyl, arachidyl, cluytinyl, behenyl, lignoceryl, cerotyl, montanyl, and mellissyl.

Exemplary R cycloaliphatic hydrocarbon substituents include cyclohexyl, cycloheptyl, cyclohexenyl, cycloheptenyl, cyclooctyl, cyclohexylethyl, cyclohexylbutyl, butylcyclohexylene, hexylcyclohexylene, and octylcyclohexylene.

Exemplary $R_1$ groups include methylene, ethylene, propylene, butylene, methyl-ethylene, 1,1- and 1,2-dimethyl-ethylene, pentylene, hexylene, 1-methyl-pentylene, tetramethyl-ethylene, 1,2,3-trimethylpropylene, 1,4-dimethylbutylene, 1,2,3-trimethyl-butylene, ethylethylene, butyl-ethylene, 2-propyl-propylene, 2,2-dimethyl-propylene, and 1-ethyl-2-methyl-propylene.

The nonionic surface active compounds in accordance with the invention are soluble in viscose solutions of all types, including cellulose xanthate and cuprammonium cellulose solutions. The amount of surface-active compound employed is sufficient to disperse or solubilize the resinous and fatty substances derived from the wood, and present as impurities with the cellulose. The amounts of these impurities vary of course, according to the source of the cellulose. In most cases, an amount of surface-active compound within the range from about 0.2 to about 40, preferably from about 0.5 to about 10, grams per kilogram of cellulose in the viscose or cuprammonium solution is sufficient.

The compound can be added to the viscose or cuprammonium solution at any stage prior to regeneration, even as late as immediately before regeneration or coagulation of the cellulose. The compound should be well distributed in the viscose or cuprammonium solution.

Accordingly, the nonionic surface-active compounds of the invention can be added to the viscose solution or to an initial or intermediate product from which the viscose solution is produced. Thus, for example, the compounds can be added to the prepared viscose solution, to the dissolving lye, to the carbon disulphide, to the alkali cellulose, to the mercerizing lye, or to the dissolving pulp, before, during, or after the drying thereof.

The compounds in accordance with the invention if present during xanthogenation also improve the filterability of the viscose solution. Poor filterability of viscose solutions is usually caused by gel particles and insoluble fiber particles, as a result of imperfect reaction between the alkali cellulose and the carbon disulphide. It is thought that surface-active agents improve viscose filterability because they aid in bringing about a more uniform reaction between the carbon disulphide and the alkali cellulose. In order to obtain this effect using the compounds in accordance with the invention, the compound should be present in the required amount before xanthogenation.

The nonionic surfactants in accordance with the invention can be prepared by known procedures, which form no part of the instant invention. They can for example be prepared by condensation of alkylene oxide with the corresponding alkanediols, in which the hydroxyl groups are positioned according to the spacing desired for the oxyalkylene groups on the hydrocarbon chain. For example, the 1,2-diols give a spacing of one carbon atom, i.e. the oxyalkylene units are present on adjacent carbon atoms, whereas the 1,6 diols give a spacing of six carbon atoms. Other intervals or spacings can be selected, as desired, intermediate these extremes.

Also, long chain alcohols or their alkylene oxide adducts can be reacted with epichlorohydrin or with glycidol to give 2,3-dihydroxypropylethers, which, after addition of alkylene oxide, give the nonionic surfactants of the invention. Long chain alpha-olefins can be reacted with thioglycerol to form 2,3-dihydroxyl propyl thioethers or thiols, which after oxidation to the sulphoxides

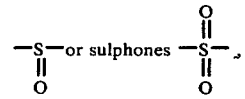

followed by condensation with alkylene oxide, give nonionic surfactants in accordance with the invention. Long chain aldehydes can be reacted with formaldehyde to give trimethylol compounds, and these can be condensed with alkylene oxide to give nonionic surfactants in accordance with the invention.

It is known that in viscose solutions a continuous redistribution of xanthogenate groups among the hydroxyl groups of the cellulose takes place. Since the nonionic surface-active compounds of the invention contain hydroxyl groups, they take part in the redistribution to a degree which depends upon the xanthogenation conditions. It has also been found that the nonionic surface-active compounds can be xanthogenated before addition to the viscose solution, without losing their effectiveness. In this case, the products obtained are reaction products of the nonionic surface active active compound and the compound of the kind which is present in a viscose solution.

The following Examples in the opinion of the inventors represent preferred embodiments of the nonionic surfactants of the invention, and viscose solutions containing the same.

EXAMPLES 1 to 15

A large batch of viscose solution with the composition 8.4% by weight cellulose and 5.2% by weight NaOH was prepared in the usual way from sulphite dissolving pulp having a resin content of 0.3% according to SCAN-C 7:62, using 30% by weight of carbon disulphide, based on the cellulose.

With stirring, 2 grams per kilogram of cellulose of the surfactants noted in Table I below were then added to separate portions of this viscose solution. For comparison purposes, three conventional viscose additives were also incorporated in separate portions of the same viscose solution. These are designated Controls A, B, C and D in Table I. Control D is the viscose solution without any additive.

Following the additions, the viscose solutions were deaerated in vacuum for 4 hours. Light transmission was then measured according to the procedure described by Ingmar Jullander, *Svensk Papperstidning* 53 719 (1950). The viscose solutions were then stored at 20° C, and the light transmission measured again after 24 and after 48 hours.

The amount of light transmitted is a measure of the capability of the surfactant in solubilizing the resinous materials. The clearer the viscose solution, i.e. the higher the percent light transmission, the more effective the compound is in solubilizing the resins, which impart turbidity to the viscose solutions.

The following results were obtained:

lene oxide adduct, Control A. Control B is a typical nonionic surfactant, and its relative ineffectiveness, compared to the coconut oil fatty amine-ethylene oxide adduct, Control A, is apparent. The superiority of the nonionic surfactants in accordance with the invention to this compound is quite remarkable.

Control C represents another type of nonionic additive, slightly better than Control B, but still quite unsatisfactory. In fact, the two nonionic additives, Controls B and C, are virtually as poor as Control D, without any additive at all.

Having regard to the foregoing disclosure, the following is claimed as the inventive and patentable embodiments thereof:

1. A viscose solution having improved processability, comprising cellulose in aqueous alkaline solution and an amount within the range from about 0.2 to about 40 g/kg cellulose of a nonionic nitrogen-free surface active compound having the general formula:

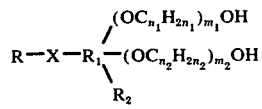

wherein:

R is a monovalent hydrocarbon group having at least six carbon atoms up to about 50 carbon atoms;

$R_1$ is a tetravalent hydrocarbon group having from one to about six carbon atoms;

X is a bivalent group selected from the group consisting of methylene, thioether —S—, oxyether —O—, sulfoxide,

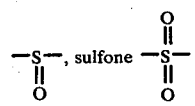

TABLE I

| Example No. | Base compound | n Moles of Ethylene oxide | % light transmission after | | |
|---|---|---|---|---|---|
| | | | 4 hours | 24 hours | 48 hours |
| 1 | dodecane-1,2-diol | 10 | 70.5 | 71.5 | 65.5 |
| 2 | " | 14 | 88 | 87.5 | 85 |
| 3 | " | 20 | 85.5 | 82.5 | 79 |
| 4 | tetradecane-1,2-diol | 9 | 62.5 | 71 | 70 |
| 5 | " | 11.5 | 86 | 82.5 | 79.5 |
| 6 | " | 16 | 92.5 | 89.5 | 91 |
| 7 | " | 23 | 90 | 88.5 | 89 |
| 8 | hexadecane-1,2-diol | 8 | 59 | 34 | 25.5 |
| 9 | " | 14 | 86.5 | 85 | 82 |
| 10 | " | 20 | 92 | 88.5 | 85.5 |
| 11 | $C_{15-18}$-alkene-1,2-diol | 17 | 86 | 81 | 75 |
| 12 | hexadecyl-2,3-dihydroxy-propyl sulphide | 25 | 76.5 | 68.5 | 60 |
| 13 | dodecyl-2,3-dihydroxy-propyl ether | 16 | 82.5 | 78.5 | 72 |
| 14 | hexadecyl-2,3-dihydroxy-propyl sulfone | 25 | 74 | 70 | 65 |
| 15 | dodecyl-2-hydroxy-3-mercaptopropyl ether | 25 | 82.5 | 78.5 | 78 |
| Controls | | | | | |
| A | Coconut oil fatty amine | 11 | 75 | 80 | 79 |
| B | Oleyl-cetyl-alcohol | 17 | 45 | 20 | 15 |
| C | Octadecane-1,12-diol | 22 | 55 | 30 | 18 |
| D | No additive | — | 24 | 14 | 10 |

The results set forth in Table I show that the surfactants in accordance with the invention, Examples 1 to 15, are quite effective in solubilizing the resins and producing a relatively clear viscose solution. Except for Examples 1, 4, 8, and 11 to 15, they are in fact superior in many instances to the art-accepted standard that is conventionally used, the coconut oil fatty amine-ethyand oxyalkylene —$(OC_nH_{2n})_mO$—, wherein $n$ is 2, 3, or 4; and $m$ is the number of oxyalkylene units and is within the range from 1 to about 30;

$R_2$ is hydrogen or an oxyalkylene group $-(OC_{n3}H_{2n3})_{m3}OH$;

$n_1$, $n_2$, $n_3$ are 2, 3, or 4; and $m_1$, $m_2$, $m_3$ represent the number of oxyalkylene units, and are within the range from 1 to about 30.

2. A viscose solution according to claim 1 wherein $n_1$ and $n_2$ are 2.

3. A viscose solution according to claim 1, wherein the nonionic surface-active compound has the general formula:

$$R-X-CH_2CHCH_2(OC_2H_4)_{m_4}OH$$
$$|$$
$$(OC_2H_4)_{m_5}OH$$

wherein:

R is a monovalent hydrocarbon group having at least six carbon atoms up to about 50 carbon atoms;

X is a bivalent group selected from the group consisting of methylene, thioether —S—, oxyether —O—, sulfoxide $$-S-,\ \text{sulfone}\ -\underset{\underset{O}{\|}}{\overset{\overset{O}{\|}}{S}}-$$
$$\underset{O}{\|}$$

and oxyalkylene $-(OC_nH_{2n})_mO-$ wherein $n$ and $m$ are as in claim 1;

$m_4$ and $m_5$ represent the number of oxyalkylene units, and are within the range from 1 to about 30.

4. A viscose solution according to claim 1 wherein the nonionic surface active compound has the general formula:

$$R-CH_2-CHCH_2(OC_2H_4)_{m_6}OH$$
$$|$$
$$(OC_2H_4)_{m_7}OH$$

wherein:

R is a monovalent hydrocarbon group having at least six carbon atoms up to about 50 carbon atoms;

$m_6$ and $m_7$ represent the number of oxyethylene units, and are within the range from 1 to about 30, and the sum of $m_6$ and $m_7$ is from about 8 to about 31.

5. A viscose solution according to claim 1, wherein X is methylene.

6. A viscose solution according to claim 1, wherein X is thioether.

7. A viscose solution according to claim 1, wherein X is oxyether.

8. A viscose solution according to claim 1, wherein X is sulfoxide.

9. A viscose solution according to claim 1, wherein X is sulfone.

10. A viscose solution according to claim 1, wherein X is oxyalkylene.

11. A viscose solution according to claim 1, wherein R is an aliphatic hydrocarbon group.

12. A viscose solution according to claim 1, wherein R is a cycloaliphatic hdrocarbon group.

13. A method for producing a viscose solution which comprises incorporating in the viscose solution comprising cellulose in aqueous alkaline solution an amount within the range from about 0.2 to about 40 grams per kg cellulose of a nonionic nitrogen-free surface-active compound having the general formula:

$$R-X-R_1\underset{\diagdown}{\diagup}\overset{(OC_{n_1}H_{2n_1})_{m_1}OH}{\underset{R_2}{(OC_{n_2}H_{2n_2})_{m_2}OH}}$$

wherein:

R is a monovalent hydrocarbon group having at least six carbon atoms up to about 50 carbon atoms;

$R_1$ is a tetravalent hydrocarbon group having from one to about six carbon atoms;

X is a bivalent group selected from the group consisting of methylene, thioether —S—, oxyether —O—, sulfoxide, $$-S-,\ \text{sulfone}\ -\underset{\underset{O}{\|}}{\overset{\overset{O}{\|}}{S}}-$$
$$\underset{O}{\|}$$

and oxyalkylene $-(OC_nH_{2n})_mO-$, wherein $n$ is 2, 3, or 4; and $m$ is the number of oxyalkylene units and is within the range from 1 to about 30;

$R_2$ is hydrogen or an oxyalkylene group $-(OC_nH_{2n})_mOH$;

$n_1$, $n_2$, $n_3$ and are 2, 3, or 4; and $m_1$, $m_2$, $m_3$ represent the number of oxyalkylene units, and are within the range from 1 to about 30.

14. A method for producing a viscose solution according to claim 13, wherein $n_1$ and $n_2$ are 2.

15. A method for producing a viscose solution according to claim 13 wherein the nonionic surface-active compound has the general formula:

$$R-X-CH_2CHCH_2(OC_2H_4)_{m_4}OH$$
$$|$$
$$(OC_2H_4)_{m_5}OH$$

wherein:

R is a monovalent hydrocarbon group having at least six carbon atoms up to about 50 carbon atoms;

X is a bivalent group selected from the group consisting of methylene, thioether —S—, oxyether —O—, sulfoxide $$-S-,\ \text{sulfone}\ -\underset{\underset{O}{\|}}{\overset{\overset{O}{\|}}{S}}-$$
$$\underset{O}{\|}$$

and oxyalkylene $-(OH_nH_{2n})_mO-$ wherein $n$ and $m$ are as in claim 1;

$m_4$ and $m_5$ represent the number of oxyalkylene units, and are within the range from 1 to about 30.

16. A method for producing a viscose solution according to claim 13, wherein the nonionic surface-active compound has the general formula:

$$R-CH_2-CHCH_2(OC_2H_4)_{m_6}OH$$
$$|$$
$$(OC_2H_4)_{m_7}OH$$

wherein:

R is a monovalent hydrocarbon group having at least six carbon atoms up to about 50 carbon atoms;

$m_6$ and $m_7$ represent the number of oxyethylene units, and are within the range from 1 to 30, and the sum of $m_6$ and $m_7$ is from about 8 to about 31.

17. A method for producing a viscose solution according to claim 13 wherein X is methylene.

18. A method for producing a viscose solution according to claim 13, wherein X is thioether.

19. A method for producing a viscose solution according to claim 13, wherein X is oxyether.

20. A method for producing a viscose solution according to claim 13, wherein X is sulfoxide.

21. A method for producing a viscose solution according to claim 13, wherein X is sulfone.

22. A method for producing a viscose solution according to claim 13, wherein X is oxyalkylene.

23. A method for producing a viscose solution according to claim 13, wherein R is an aliphatic hydrocarbon group.

24. A method for producing a viscose solution according to claim 13, wherein R is a cycloaliphatic hydrocarbon group.

* * * * *

UNITED STATES PATENT OFFICE
CERTIFICATE OF CORRECTION

Patent No. 4,025,353  Dated May 24, 1977

Inventor(s) Svante Ludvig Wahlen

It is certified that error appears in the above-identified patent and that said Letters Patent are hereby corrected as shown below:

Column 1, line 44 : "rsidues" should be --residues--

Column 1, line 55 : "solubilzers" should be --solubilizers--

Column 1, line 65 :

should be

I. 

Column 2, line 30 :

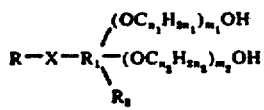

should be

II. 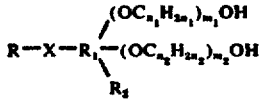

Column 2, line 51 : "$-(OC_nH_{2n})_m OH$" should be $-(OC_{n_3}H_{2n_3})_{m_3} OH$

UNITED STATES PATENT OFFICE
CERTIFICATE OF CORRECTION

Patent No. 4,025,353   Dated May 24, 1977

Inventor(s) Svante Ludvig Wahlen

It is certified that error appears in the above-identified patent and that said Letters Patent are hereby corrected as shown below:

Column 2, line 67 : "with" should be --within--

Column 3, line 5 :
$$R-X-CH_2CHCH_2(OC_2H_4)_{m_4}OH$$
$$(OC_2H_4)_{m_5}OH$$

should be

III.
$$R-X-CH_2CHCH_2(OC_2H_4)_{m_4}OH$$
$$(OC_2H_4)_{m_5}OH$$

Column 3, line 15 :
$$R-CH_2-CHCH_2(OC_2H_4)_{m_6}OH$$
$$(OC_2H_4)_{m_7}OH$$

should be

IV.
$$R-CH_2-CHCH_2(OC_2H_4)_{m_6}OH$$
$$(OC_2H_4)_{m_7}OH$$

Column 5, line 26 : "Ingmar" should be -- Ingvar--

Column 7, lines 3 & 4: "$(OC_{n_3}H_{2n_3})_{m_3}OH$" should be $-(OC_{n_3}H_{2n_3})_{m_3}OH$

UNITED STATES PATENT OFFICE
CERTIFICATE OF CORRECTION

Patent No. 4,025,353                Dated May 24, 1977

Inventor(s) Svante Ludvig Wahlen

It is certified that error appears in the above-identified patent and that said Letters Patent are hereby corrected as shown below:

Column 8, line 27 : "$-(OC_nH_{2n})_m OH$" should be $-(OC_{n_3}H_{2n_3})_{m_3} OH$ Column 8, line 54 : "$OH_nH_{2n})_m O$" should be $-(OC_nH_{2n})_m O-$ Signed and Sealed this Thirteenth Day of June 1978

[SEAL]

Attest:

RUTH C. MASON
Attesting Officer

DONALD W. BANNER
Commissioner of Patents and Trademarks